(12) United States Patent
Radulescu et al.

(10) Patent No.: US 8,437,277 B2
(45) Date of Patent: May 7, 2013

(54) AUTOMATIC NETWORK MAPPING FROM A HOST CONTROL DEVICE

(75) Inventors: Andrei Radulescu, Eindhoven (NL); Dennis Koutsoures, Oak Park, IL (US); Peter Van Den Hamer, Waalre (NL)

(73) Assignee: St-Ericsson SA, Plan-les-Ouates (CH)

( * ) Notice: Subject to any disclaimer, the term of this patent is extended or adjusted under 35 U.S.C. 154(b) by 23 days.

(21) Appl. No.: 12/734,009

(22) PCT Filed: Oct. 3, 2008

(86) PCT No.: PCT/IB2008/054043
§ 371 (c)(1),
(2), (4) Date: Oct. 7, 2010

(87) PCT Pub. No.: WO2009/044369
PCT Pub. Date: Apr. 9, 2009

(65) Prior Publication Data
US 2011/0044205 A1    Feb. 24, 2011

Related U.S. Application Data

(60) Provisional application No. 60/977,233, filed on Oct. 3, 2007.

(51) Int. Cl.
*H04L 12/28* (2006.01)
(52) U.S. Cl.
USPC .......................... 370/254; 370/392; 709/223
(58) Field of Classification Search .................. 370/254, 370/400; 709/223
See application file for complete search history.

(56) References Cited

U.S. PATENT DOCUMENTS

| | | | |
|---|---|---|---|
| 6,496,503 B1 | 12/2002 | Pelissier et al. | |
| 7,733,800 B2 * | 6/2010 | Huibregtse | 370/254 |
| 7,870,246 B1 * | 1/2011 | Davis et al. | 709/224 |
| 2003/0163556 A1 * | 8/2003 | Haneda | 709/223 |
| 2007/0097881 A1 * | 5/2007 | Jenkins et al. | 370/254 |
| 2008/0307079 A1 * | 12/2008 | Choi et al. | 709/223 |

FOREIGN PATENT DOCUMENTS
WO    WO 2006/011698 A2    2/2006

OTHER PUBLICATIONS

International Search Report dated Mar. 25, 2009 in connection with PCT Patent Application No. PCT/IB2008/054043.
Written Opinion of the International Searching Authority dated Mar. 25, 2009 in connection with PCT Patent Application No. PCT/IB2008/054043.

* cited by examiner

*Primary Examiner* — Jung Park
(74) *Attorney, Agent, or Firm* — Coats & Bennett, P.L.L.C.

(57) ABSTRACT

Disclosed are methods, and control devices (110, 210, 310) having programmable processors configured to implement methods, of communicating with a network (100, 300) having an initially unknown topology and a plurality of unknown devices. The methods use set and get configuration commands to discover the unknown devices on the network using one or more host ports of the control device, enumerating the discovered devices by using the one or more host ports to assign a different network address to each discovered device, so that the enumerated devices correspond to the network topology.

17 Claims, 3 Drawing Sheets

AUTOMATIC NETWORK MAPPING FROM A HOST CONTROL DEVICE

CROSS-REFERENCE TO RELATED APPLICATION(S)

The present application claims priority under 35 U.S.C. §365 to International Patent Application No. PCT/IB2008/054043 filed Oct. 3, 2008, entitled "AUTOMATIC NETWORK MAPPING FROM A HOST CONTROL DEVICE". International Patent Application No. PCT/IB2008/054043 claims priority under 35 U.S.C. §365 and/or 35 U.S.C. §119 (a) to U.S. Provisional Patent Application No. 60/977,233 filed Oct. 3, 2007 and which are incorporated herein by reference into the present disclosure as if fully set forth herein.

The present disclosure generally relates to configuring a network at boot or reset. One concern in the mobile industry is providing communication standards aimed at chip-to-chip networks, for example using high-speed serial links. General purpose protocols can solve interconnect problems that otherwise might occur due to the existence of multiple different devices on the network each running different software. Interconnect problems include error handling, flow control, routing and arbitration. To allow flexibility in how devices are connected to a network without a major impact on the software, devices can be discovered and enumerated automatically at boot time.

According to one embodiment, the present invention provides control devices having one or more host ports for connecting to and communicating with a network having an initially unknown topology and a plurality of unknown devices. The control devices further include a programmable processor configured to execute a start-up program that uses set and get commands to map the network. The network is mapped by discovering the plurality of unknown devices on the network using the one or more host ports, and enumerating the discovered devices using the one or more host ports so that the enumerated devices correspond to the network topology.

According to one embodiment, the present invention further provides control devices configured to use set and get commands for connecting to and communicating with a network having an initially unknown topology and a plurality of unknown devices. The control devices include means for discovering the unknown devices on the network using one or more host ports of the control device, and means for enumerating the discovered devices using the one or more host ports by assigning a different network address to each discovered device.

According to one embodiment, the present invention additionally provides methods for using a control device to execute set and get commands for connecting to and communicating with a network having an initially unknown topology and a plurality of unknown devices. The methods include the steps of discovering the unknown devices on the network using one or more host ports of the control device, and enumerating the discovered devices by using the one or more host ports to assign a different network address to each discovered device so that the enumerated devices correspond to the network topology.

The above summary is not intended to describe each embodiment or every implementation of the present disclosure. The figures and detailed description that follow more particularly exemplify various embodiments.

The invention may be more completely understood in consideration of the following detailed description of various embodiments in connection with the accompanying drawings, in which.

Figure 1:
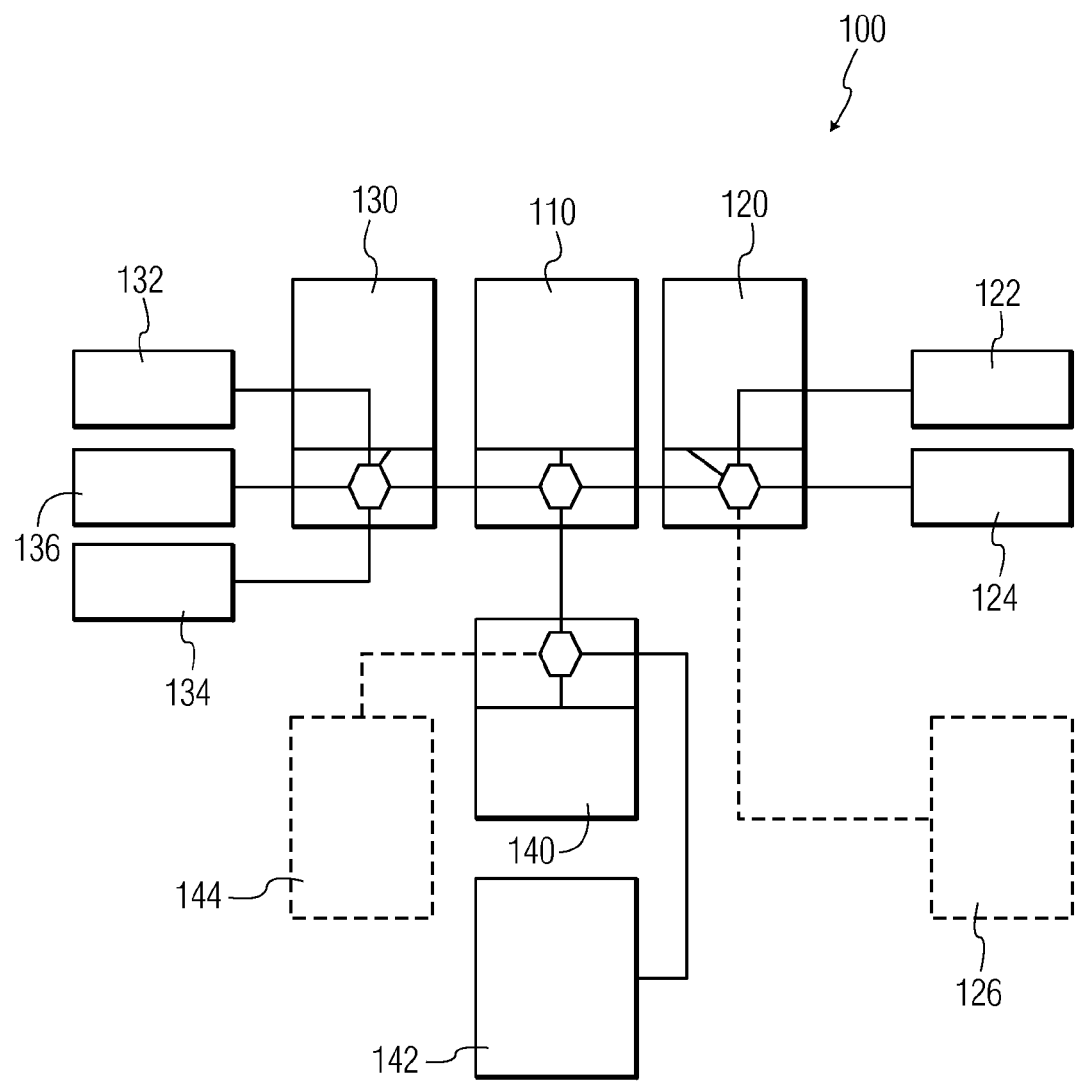
FIG. 1 is a schematic view of a network whose topology can be mapped by a host control device on the network in accordance with the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

Aspects of the present invention relate to automatically discovering and mapping the topology of a network at boot or reset, the enumeration of the network being performed from a host control device. While automatic device discovery and enumeration can be executed using read and write protocols (e.g., such as used in PCI Express), a special topology has generally been assumed in which the port to the "root" (from where the discovery and enumeration is performed) has a special status and is known (i.e., hardwired) at boot time. In a network that can have any topology, and where there are no ports with a special status, a network router is not able to initially route responses back to the host, particularly because the routing table is not configured. At the same time, the host cannot know or obtain a router's port to the host, and thus cannot configure the routing table. An alternative to having an assumed topology is to use a specialized protocol for device enumeration and discovery. However, developing such a specialized protocol can take years of cooperative effort, resulting in delayed implementations. Various embodiments of the present invention provide methods, and control devices for implementing the methods, in which device discovery and enumeration to map an initially unknown network topology can be performed from a host control device using configuration commands, and in particular without defining a specialized protocol and without requiring an assumed topology.

FIG. 1 shows an example of a networked system 100 that includes various devices, including switches and endpoints. Generally, a control device 110 can be connected via an on-chip router 110R on-chip routers of other devices, such as routers 120R, 130R and 140R, that are each associated with endpoint devices 120, 130 and 140, respectively. In turn, router 120R can be connected to endpoint devices 120, 122, 124 and 126, router 130R can be connected to endpoint device 130 and to devices 132 and 134 that are connected to another device 136, and router 140R can be connected to a second control device 140, and to devices 142 and 144.

Control devices generally include a processor and one or more communication ports, and may also include a memory device. Examples of control devices include application engines, baseband processors, and so forth. Switches or routers are devices that include multiple communication ports to connect a device to one or more other devices. Switches are usually integrated on the same chip with one or several devices, although they can also be implemented on a separate chip. In the embodiments presented herein, switches are assigned a network address to allow them to be configured in the same way as any other device in the network. Endpoint devices are those devices that include a single communications port, for example a display, media engine, graphics accelerator, camera, modem (e.g., GSM, 3G, LTE), connectivity device (e.g., WiMax, WLAN, Bluetooth), storage device (e.g., flash, hard disk, optical disk), and so forth.

For illustrative purposes, network 100 can be considered as a video conferencing system. In such a case, the host control device 110 is connected via its on-chip router 110R to router 120R, the on-chip router for media engine 120. Media engine 120 can perform image/video compression/decompression, image/video enhancement, graphics engine functions for gaming, and so forth. Router 120R serves as a media bridge, and is connected to router 130R, the on-chip router for communication engine 130. Router 130R serves as a communications bridge. On the media side, endpoint device 122 could be a camera operating in video mode, endpoint device 124 could be a display local to control device 110, and endpoint device 126 could be a mass storage device for recording the video conference. On the communications side, device 132 could be a cellular modem for teleconferencing, device 134 could be a wireless local area network device, for example to provide for simultaneous background file synchronization, and device 136 could be a wireless headset, for example connected using Bluetooth. Optionally, host control device 110 can be connected to another control device 140, which in this case is shown to be a driver for a high definition auxiliary display device 142, and that is optionally connected to a mass storage device 144.

Host control device 110 includes one or more ports for connecting to and communicating with other devices in the network 100. As indicated by the connections in FIG. 1, control device 110 is shown to include at least three ports. The control device 110 also includes a programmable processor configured to execute a start-up program, for example a start-up program that is stored in a local nonvolatile memory, that can be recalled for execution upon system boot or reset. In executing the start-up program, the processor uses commands to set and get attributes from each successive device that it finds on the network, thereby discovering each device, assigning network addresses, and setting switch routing tables along the way.

In a particular instance, the startup program is used by the processor to first initialize/enumerate control device 110. It then checks for a device on one of its ports. If the processor finds a device, it initializes/enumerates the device. Some devices function as switches that allow for a single port from the processor to connect to multiple devices. Thus, if a switch is detected, the processor checks each port of the switch for devices. Any discovered devices are enumerated and the corresponding ports of the switch are configured to route data destined for those devices, respectively. Once all the devices are detected on a port, the processor can perform similar initialization/enumeration using the remaining ports.

For simplicity, many of embodiments herein assume that the processor completely configures one port before configuring portions of other ports (and thereby allow for easy use of a recursive algorithm); however, the processor need not proceed with the initialization/enumeration using such a recursive and exclusive algorithm. For instance, the processor could use a round-robin initialization procedure that rotates initialization of devices between each of the ports and the devices connected thereto. Also for simplicity reasons, many of the embodiments disclosed herein assume a tree network topology. However, the presented methods and devices are no so limited, and can be used to discover and enumerate networks with any topology by creating a logical spanning tree during discovery, for example by walking the network in a breath-first manner, and skipping already visited nodes.

As will be appreciated, the configuration shown for network 100 is only one possible configuration so that at reset or system boot, a specific network topology cannot be assumed. In these cases, the methods and control devices of the present invention can be used to automatically discover and enumerate the devices on the network to prepare for normal operation.

Figure 2:
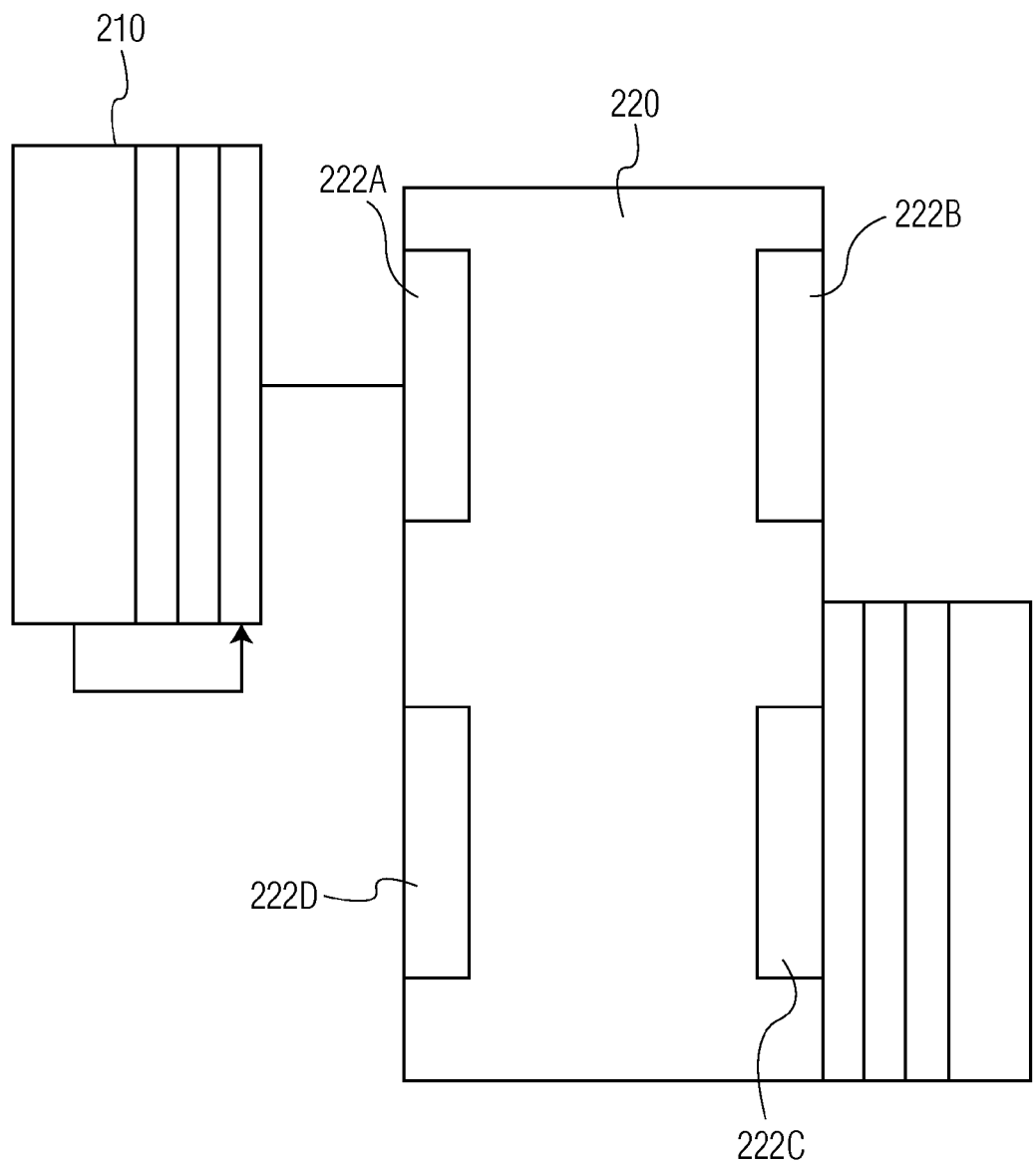
FIG. 2 is a schematic view of a host control device connected to and configuring a switch in accordance with the present invention.

FIG. 2 can be used to illustrate device discovery and enumeration steps that can be implemented in the present invention. FIG. 2 shows a host control device 210 connected to a switch device 220 that has four ports 222A-D, port 222D being the switch configuration port that receives the switch network address and stores the switch routing table, and port 222A being connected to the host device 210. The host device 210 and switch 220 can be located on the same chip, or on two different chips. At start-up, the network topology is unknown, which means that the devices and connections are unknown. As an initial step, the host device 210 can configure itself, which includes reserving a number of network addresses for itself based on the number of host device ports. Generally, host control device configuration takes place in accordance with a proprietary process for that control device.

Once the host device 210 is configured, the host starts configuring the additional network nodes using "Set" and "Get" configuration commands to set and retrieve attributes. When configuring each next device, the host assigns the next available network address to the device, and generally receives a confirmation message back from the device. Once an endpoint device has been discovered and enumerated with a network address, the host control device can move on to discover the next device. Endpoints can be determined by finding a device having only one port. If more than one port is present, the device is considered to be a switch.

When the next device is a switch, such as shown in FIG. 2, the control device 210 first sets the routing table of the switch 220 so that communications are routed through initial communications port 222A, which is the port that is connected to the host device. In some instances packets from host device 210 are by default routed to the configuration port 222D of switch 220, the configuration port being a default port to which data packets (destined for the switch) are routed during normal operation. Before the switch's routing table is set, an initial routing condition can be used whereby the initial ingress port 222A is saved and used for routing responses back to the host device 210. This may require disabling normal communications routing until the switch 220 is fully configured. The number of ports on switch 220 can then be determined so that a correct number of network addresses can be reserved. Once the local ports of the switch have been fully enumerated, the routing table can be set, and the initial routing condition can be disabled in favor of normal routing.

Device discovery and enumeration can then proceed in this fashion by successively following the device connections through each port on switch 220 until an endpoint is reached, and then doing the same with the next switch port until all connections leading to endpoints are found for all the ports of the switch 220. The same process is followed for each connection to the host control device until the network is fully enumerated. At this point, the network topology is fully mapped, and communications can take place under normal conditions.

Figure 3:
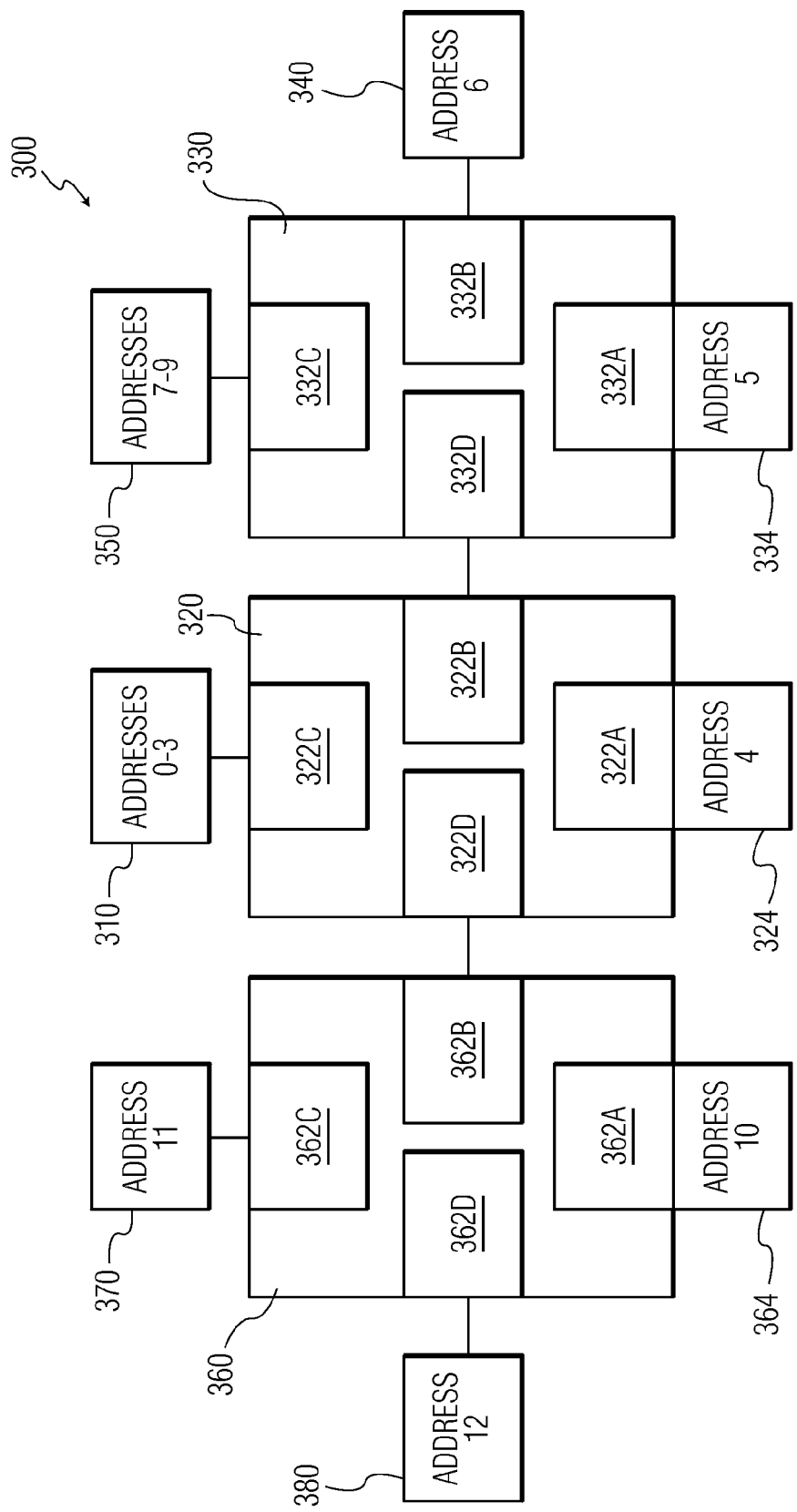
FIG. 3 is a schematic view of a network topology mapped in accordance with the present invention.

FIG. 3 shows an example of a network topology after device discovery and enumeration according to the present invention. Network 300 includes the host control device 310 that is assigned the first four network addresses, numbers 0 through 3, based on its number of ports. Host 310 is connected to switch 320 via port 322C. Other connections to host 310 are possible, but are not shown in FIG. 3. Switch 320 includes four ports, including configuration port 322A, port 322B connected to switch 330, port 322C connected to host 310, and port 322D connected to switch 360. Switch 320 is the first device encountered by host 310, and thus is assigned the next network address, number 4, as indicated by routing table 324. After enumerating switch 320, switch 330 is discovered and enumerated, receiving the next available network address, number 5, as indicated by routing table 334. Switch 330 includes configuration port 322A, port 332B connected to device 340, port 332C connected to device 350, and port 332D connected to switch 320. After enumerating switch 330, the devices connected to switch 330 are enumerated, namely device 340, which is given network address number 6, and device 350, which receives network address number 7 through 9. Next, switch 360 is discovered, which receives the next available network address number 10, as indicated by routing table 364. Switch 360 has configuration port 362A, port 362B connected to switch 320, port 362C connected to device 370, and port 362D connected to device 380. After enumerating switch 360, the devices connected to switch 360 are enumerated, namely device 370, which receives network address 11, and device 380, which receives network address 12.

While the present invention can be implemented in any suitable environment, it is instructive to describe various aspects in terms of particular addressing schemes and communication protocols. As such, the description that follows will define and use the rules defined by an addressing scheme and communication protocol, although those of skill in the art will appreciate that environment-dependent variations still fall within the spirit and scope of the present invention.

In an exemplary chip-to-chip communication protocol, devices can be identified using a network address (referred to for illustrative purposes as a "DeviceID"), and device communication takes place using ports. A device (identified by its DeviceID) sending a data packet from a port, "Port," computes the destination device address, "DestDeviceID," and destination port, "DestPort," as follows:

DestDeviceID=DeviceID+⌊Port/32⌋;

DestPort=Port%32, where % denotes the modulo operator. A device receiving a data packet, knowing the DeviceID, can extract the Port information as follows:

Port=(DestDeviceID−DeviceID)×32+DestPort.

The DestDeviceID is valid for a device if the following condition is met:

DeviceID≦DestDeviceID≦DeviceID+⌊MaxPort/32⌋.

Using this basic addressing scheme, two modes of communication can be defined, called connection-oriented (CO) communication and connection-less (CL) communication. CO communication means that before any data can be transferred, a connection needs to exit between two devices. CL communication does not have such a requirement because all the information needed for communication exists within the data packet being communicated, as opposed to some of the information existing by virtue of the connection as with CO communication.

In CO communication, a device access point to a connection is called a "CPort." The state of a CPort contains the DeviceID and CPort of the peer device, the traffic class the connection is mapped to, and the optional end-to-end flow control state. Owing to the fact that all this state information is contained in the CPort, data transmission can take place simply by the device supplying the data. Table 1 sets forth a data frame format for CO communication.

TABLE 1

| | | | | | | | | | | | | | | | |
|---|---|---|---|---|---|---|---|---|---|---|---|---|---|---|---|
| | CO data frame format |
| 15 | 15 | 14 | 13 | 12 | 11 | 10 | 9 | 8 | 7 | 6 | 5 | 4 | 3 | 2 | 1 | 0 |
| 1 | | | ESC_DL | | | | | | SOF (000) | | | TCx | | Reserved | |
| 0 | L3s = 1 | | DestDeviceID | | | | | | L4s = 0 | | DestCPort | | | FCT | EoM |
| 0 | | | | | | | | | Payload | | | | | | |
| 1 | | | ESC_DL | | | | | | EOF (011) | | | Sequence Number | | | |
| 0 | | | | | | | | | CRC | | | | | | |

The first symbol and last two symbols of the CO data frame format represent the header and trailer, respectively. The header includes an escape byte (ESC_DL), a symbol control identification field (which in the case of a data frame header is SOF, or "Start Of Frame"), the traffic class, "TCx," and three reserved bits. The trailer includes the EOF, or "End Of Field," control symbol, and a CRC symbol for error detection. The EOF symbol includes an escape byte (ESC_DL), the symbol control identification field (which in the case of a data frame trailer is EOF), and the frame sequence number.

The frame includes an L3 data unit and L4 data unit, each having a one-byte header and no trailer. The L3 header includes the L3 data unit's bit set to 1, indicating a short L3 header; and the DeviceID of the peer device. The L4 header includes the L4 data unit's bit set to 1, indicating a short L4 header, the destination CPort, an FCT bit used to transmit end-to-end flow-control credits to the peer CPort, and an EOM bit used by the application to indicate an end of message. When communicating through a CPort (i.e., on a connection) such as in CO communication, the application need only deliver data and indicate the message boundaries. The remaining information needed to transfer the data is filled in using the CPort state.

CL communication differs from CO communication primarily in that CL communication adds overhead in the data packet (e.g., source port, source Device ID, protocol ID, etc.) that in CO communication exists as part of the connection state. CL communication also lacks end-to-end flow control, meaning that at the destination device data can be discarded due to overflow. The advantages of CL communication include the ability to send data very quickly, without the need of establishing a connection first. A device access point to a connection-less service is called "RPort." Table 2 sets forth a data frame format for CL communication.

TABLE 2

| | | | | | | | | | | | | | | | |
|---|---|---|---|---|---|---|---|---|---|---|---|---|---|---|---|
| 15 | 15 | 14 | 13 | 12 | 11 | 10 | 9 | 8 | 7 | 6 | 5 | 4 | 3 | 2 | 1 | 0 |

CL data frame format

| | | | | |
|---|---|---|---|---|
| 1 | | ESC_DL | SOF (000) | TCx | Reserved |
| 0 | L3s = 1 | DestDeviceID | | SrcDeviceID | Ext = 0 |
| 0 | L4s = 0 | DestPort = 0 FCT EoM CPort | SrcPort | Ver = 0 Ext = 1 |
| 0 | | Protocol ID | | | Ext = 0 |
| 0 | | Payload | | | |
| 1 | | ESC_DL | COF (011) | Sequence Number | |
| 0 | | | ESC_DL | | |

The header (first symbol) and trailer (last two symbols) of the CL data frame are identical to those in the CO data frame. The L3 header for CL communication is extended to also include the source DeviceID field ("SrcDeviceID") to indicate from what device the packet originates. The L3 header also includes one "Ext" bit per L3 symbol, which, if set to 1 indicates the presence of another L3 symbol, and otherwise indicates the end of the L3 header (Table 2 shows no L3 extensions). The L4 header is extended in CL communication to include a CPort bit to indicate if the segment addresses a CPort (CPort bit set to 1) or an RPort (CPort bit set to 0), the source port ("SrcPort"), a Ver bit set to 0 indicating a first generation version (keeping open the option of defining new L4 data units in the future), one Ext bit per L4 symbol that functions as with the L3 header (Table 2 shows one L4 extension for the "Protocol ID"), and a Protocol ID field to indicate the communication protocol used by the application.

For CL communication, the application sends data messages that fit in the defined frame format. The application specifies the destination DeviceID and RPort, and optionally the Protocol ID. Messages are packetized without being segmented before being sent through the network. At the receive side, the application is delivered the source DeviceID and source RPort in addition to the message itself.

Configuration protocols used in the present invention include basic write and read commands, referred to herein as Set and Get, for setting and reading attribute values. These commands are issued by a so-called initiator and executed by a so-called target. The Set and Get command translate into a request message carrying the command and its parameters, and a response message acknowledging the arrival and execution of the command. Possible messages include: a "Type" field, indicating the configuration message type (e.g., Set command, Get command, Set response, Get response); an optional "Length" field, indicating the length in bytes of the attribute value that is the object of the Set or Get command; and an "Attribute" field, indicating the attribute identified that is the object of the Set or Get command. In the case of a Set message, the request also includes the value itself, which may spawn over several symbols. The Get message has a different value for the Command field, and no Value field. The response messages are again identified by the Type field, and can include, for example, "SET_SUCCESS," "GET_SUCCESS," and "FAILURE." In the SET_SUCCESS case, no additional fields are necessary. For GET_SUCCESS, the value specified in the Get request is returned in a Value field. For the FAILURE response, a "FailureReason" field could indicate the reason the command failed (e.g., wrong or invalid DeviceID, wrong or invalid RPort, non-existent attribute, access to attribute temporarily locked by another device, value outside the attribute range, etc.).

After boot or reset, the topology of the network is not known, and no network addresses are assigned. Discovering the topology and assigning addresses to all the network nodes (routers and endpoint devices) can be performed by the host using a configuration protocol. CL-based discovery and enumeration and CO-based discovery and enumeration can be performed using similar steps, with some differences. It is instructive to delineate the various procedural steps under both ways of communicating.

A top level view of CL communication based discovery and enumeration is shown in Table 3. Three constants are defined: CFG_RPORT (Line 0), representing the target RPort used for network configuration; CFG_TC (Line 1), representing the traffic class used for configuration; and DEVICEID_MAX (Line 2), representing the maximum number of DeviceIDs allowed. Additionally, the RPort where the host issues configuration commands is set. The nextDeviceID variable is used to indicate the next DeviceID that can be assigned. When the procedure is just starting, nextDeviceID is initialized to 0, as shown on Line 4.

TABLE 3

Top view of CL-based device discovery and enumeration

```
#define CFG_RPORT 0
 1. #define CFG_TC 1
 2. #define DEVICEID_MAX 127
 3. #define CFG_CPORT_HOST 0
 4. nextDeviceID = 0;
 5. LocalSET (N_DeviceID = nextDeviceID);
 6. hostDeviceID = nextDeviceID;
 7. numCPorts = LocalGET (T_NumCPorts);
 8. numRPorts = LocalGET (T_NumRPorts);
 9. nextDeviceID += (numCPorts + numRPorts) / 32 + 1;
10. LocalSET (T_TrafficClass[CFG_RPORT_HOST] = CFG_TC);
11. LocalSET (T_ConnectionState[CFG_RPORT_HOST] = ACTIVE);
12. nextDeviceID = Enumerate (nextDeviceID);
```

The procedure begins by enumerating the host control device. The initial value of nextDeviceID is used for assigning the N_DeviceID to the host (Line 5), and is stored in hostDeviceID for future reference (Line 6). The host sets attributes for its local stack using the LocalSET( ) function, which is typically implemented using proprietary means depending on the particular host device. Lines 7 and 8 show the host retrieving the number of CPorts and RPorts from its own stack. Again, this is performed using LocalGET( ), and typically by proprietary means. The number of CPorts and RPorts is used to compute the number of DeviceID values reserved for the host (Line 9).

Before the actual discovery and enumeration of the other devices in the network starts, the RPort is set for using the configuration traffic class CFG_TC (Line 10) and enabled for communication (Line 11). The network device discovery and enumeration is then performed by the Enumerate( ) function, which is called on Line 12. The Enumerate( ) function takes as an argument the next available DeviceID (nextDeviceID) after the host has been enumerated, and returns the next available DeviceID after the whole network has been enumerated. The return value can be used in a second network sweep to update the routing tables between devices other than the host.

Table 4 shows details for the enumeration function in CL-based discovery and enumeration ("CL Enumerate( )"). The CL Enumerate( ) function is executed by the host, and uses GET( ) and SET( ) configuration calls to retrieve and set attributes. As CL communication is used, the GET( ) and SET( ) functions take as the first two arguments the DeviceID and RPort of the target device. In the case of a GET( ) the third argument is the attribute identifier. In the case of a SET( ) the third argument is a pair that includes an attribute identifier and the value to which it needs to be. The SET( ) and GET( ) configuration commands result in network usable data units, which will be transported to the indicated destination device.

ceID are accepted. When the host turns the flag off after the DeviceID is set, only packets with valid DestDeviceID values are accepted.

Another issue involves the target devices having their configuration RPort CFG_RPORTs ready to be able to accept request configuration messages and issue response configuration messages. This can be resolved by having the configuration RPort come out of reset enabled and using Traffic Class 1. Additionally, a target switch device should be able to route request configuration packets to the configuration switch port. This can be accomplished by having the switch routing table come out of reset in a state where all packets are routed to the switch's configuration port (i.e., packets containing any DestDeviceID value will be routed to the switch's configuration port).

TABLE 4

Enumerate( ) function for CL-based device discovery and enumeration

```
13.  DeviceIDType Enumerate (DeviceIDType nextDeviceID)
14.  {
15.      numSwitchPorts = GET (nextDeviceID, CFG_RPORT, N_NumSwitchPorts);
16.      if (numSwitchPorts > 1) {
17.          swPortToHost = GET (nextDeviceID, CFG_RPORT, N_SwitchPortToHost);
18.          SET (nextDeviceID, CFG_RPORT, N_RT.start[swPortToHost] = hostDeviceID);
19.          SET (nextDeviceID, CFG_RPORT, N_RT.end[swPortToHost] = nextDeviceID−1);
20.          SET (nextDeviceID, CFG_RPORT, N_RT.default[swPortToHost] = TRUE);
21.          cfgSwPort = GET (nextDeviceID, CFG_RPORT, N_CfgSwPort);
22.          SET (nextDeviceID, CFG_RPORT, N_RT.start[cfgSwPort] = nextDeviceID);
23.          SET (nextDeviceID, CFG_RPORT, N_RT.end[cfgSwPort] = nextDeviceID);
24.          SET (nextDeviceID, CFG_RPORT, N_EnSpecialRouting = OFF);
25.      }
26.      SET (nextDeviceID, CFG_RPORT, N_DeviceID = nextDeviceID);
27.      thisDeviceID = nextDeviceID;
28.      numCPorts = GET (thisDeviceID, CFG_RPORT, N_NumCPorts);
29.      numRPorts = GET (thisDeviceID, CFG_RPORT, N_NumRPorts);
30.      nextDeviceID += (numCPorts + numRPorts) / 32 + 1;
31.      if (numSwitchPorts > 1)
32.      {
33.          SET (thisDeviceID, CFG_RPORT, N_RT.end[cfgSwPort] = nextDeviceID − 1);
34.          for (sp = 0; sp < numSwitchPorts; sp++) {
35.              if ((sp == cfgSwPort) || (sp == swPortToHost))
36.                  continue;
37.              SET (thisDeviceID, CFG_RPORT, N_RT.start[sp] = nextDeviceID);
38.              SET (thisDeviceID, CFG_RPORT, N_RT.end[sp] = DEVICEID_MAX);
39.              nextDeviceID = Enumerate (nextDeviceID);
40.              SET (thisDeviceID, CFG_RPORT, N_RT.end[sp] = nextDeviceID−1);
41.          }
42.      }
43.  }
```

The enumerate function starts by requesting the number of switch ports (Line 15). If the target device is a switch (i.e., a router), the request will return the number of switch ports. Otherwise, the device is considered an endpoint, and the request will return 1 as the number of ports. Because the GET( ) command and its responses result in network configured data units from the host to the target device and from the target device to the host, but without the target device being enumerated and configured yet, several issues can arise.

One such issue involves allowing the target device, after reset, to accept packets that do not match its own N_DeviceID. One way to achieve this is to use a flag indicating that the N_DeviceID attribute is not set, in which case data packets with any DestDeviceID are accepted. After the DeviceID is set, the flag is reset, restoring normal operating conditions whereby only the packets with valid DestDeviceID values are accepted. An alternative is to start in a special state after reset, indicated by a flag, in which packets carrying any DestDeviceID are accepted.

Another issue involves the ability of a target switch device to route response configuration packets back to the host device. If the switch port to host and the host DeviceID are known, the routing tables could be configured at reset to route the packets carrying the host DeviceID to the switch port to host. However, if flexibility is needed for attaching the host to any of the switch ports (e.g., due to mechanical constraints), pre-configuring the switch at reset may not be possible. An alternative is to have the switch remember the ingress port where it receives the first packets, and use this port to route back response configuration packets.

When a request is received, such as a GET, the target is also informed about the packet's source Device ID and RPort. These are used by the target device when returning responses.

Referring back to Table 4, the retrieved number of ports (Line 15) can be used to determine whether the current target device is a switch (having more than one port) or an endpoint (having a single port). If the target device is a switch (Line 16), the routing tables will be configured, after which the initial special routing is turned off in favor of normal operations. The routing table for the switch port to host is configured by first retrieving the saved port to host from the target device (i.e., the ingress port at which configuration packets are received) at Line 17, followed by setting up the routing table entry for the port to host to the host DeviceID range and setting the port to host as default (Lines 18-20). This is merely an example of a routing table configuration—any suitable routing table organization and configuration is also possible, as will be appreciated from the present description.

The routing table entry to the switch's configuration port is similar. First the switch port to configuration is retrieved (Line 21), after which the routing table is set (Lines 22-23). After routing table entry is configured for the switch port to host, the initial special routing can be turned off (Line 24).

At Line 26, the target device is assigned the next available DeviceID. This automatically enables the temporarily disabled feature of rejecting all packets not carrying a DestDeviceID valid for the destination device. The assigned DeviceID is saved (Line 27) for future reference in the discovery procedure. Further, at Lines 28 and 29, respectively, the total number of CPorts and RPorts is retrieved to help in computing the range of DeviceID for the current device, and, hence, the next available DeviceID at Line 30. In the case of a switch (Line 31), first the routing table to the switch configuration port is updated for the case there are more than 32 C- and R-Ports (Line 33). This step is optional, as a typical switch should not have more than 32 ports.

For each switch port (Line 34), the Enumerate( ) function is called recursively (for example, in a depth-first order) to enumerate devices further. The already configured switch ports, namely the ports to host and configuration, are skipped (Lines 35-36). For each of the other ports, the routing table towards the next to-be-enumerated device is configured (Lines 37-38) such that all DestDeviceID's are temporarily routed to the enumerated port. This can help avoid unwanted updates of the routing table along the path from the host to a newly enumerated device for each discovered device. At Line 39, the enumeration function itself is called, which returns the next available DeviceID after all devices at the current port have been enumerated. This value is used to update the routing table entry for this switch port to the right range (Line 40).

If a range-based routing table implementation is used, the routing table configuration is complete after the above Step 12. However, for other routing-table implementations (e.g., routing tables not having a default port), an additional step may be needed to complete the routing table setup by filling up the routing table between all devices other than the host using the topology information collected by the host during enumeration. Such an additional step may be needed even for routing tables using default ports, in case the routers should discard packets with a DestDeviceID that does not point to any device in the network. In such a case, the value returned at Step 12 by Enumerate( ) is used to configure the valid DeviceID range for the default ports in every router.

CO-based discovery and enumeration is similar to the CL-based discovery and enumeration. The differences lie in the way the host establish the initial link to the target device. The top view of the CO-based discovery and enumeration is shown in Table 5. As in the CL case, three constants can be defined: the target configuration port ("CPort" in this case), the traffic class, and the maximum number of devices (Lines 44-46). Additionally, the host control device's configuration port can be defined (Line 47). Next, the host DeviceID is computed in the same way as for CL (Lines 49-54). The first difference occurs when setting up the local port. In the case of CO communications, the port is a CPort (configurable by others using configuration or a dedicated protocol), and a flag is set to reserve the CPort before any other configuration on the CPort is performed (Line 55). After this, the local end of the connection can be configured by setting the peer CPort and the traffic class used for configuration, which are both known values (Lines 56-57). When the host is configured, the Enumerate( ) function is called recursively (Line 59).

TABLE 5

Top view of CO-based device discovery and enumeration

| 44. | #define CFG_CPORT 0 |
| 45. | #define CFG_TC 1 |
| 46. | #define DEVICEID_MAX 127 |
| 47. | #define CFG_CPORT_HOST 0 |
| 48. | |
| 49. | nextDeviceID = 0; |
| 50. | LocalSET (N_DeviceID = hostDeviceID); |
| 51. | hostDeviceID = nextDeviceID; |
| 52. | numCPorts = LocalGET (T_NumCPorts); |
| 53. | numRPorts = LocalGET (T_NumRPorts); |
| 54. | nextDeviceID += (numCPorts + numRPorts) / 32 + 1; |
| 55. | LocalSET (T_ReserveCPort[CFG_CPORT_HOST = TRUE); |
| 56. | LocalSET (T_PeerCPortID[CFG_CPORT_HOST] = CFG_CPORT); |
| 57. | LocalSET (T_TrafficClass[CFG_CPORT_HOST] = CFG_TC); |
| 58. | |
| 59. | nextDeviceID = Enumerate (nextDeviceID); |

Table 6 shows the Enumerate( ) function details for CO-based communications. First, the host configures its end of the connection to point to the newly enumerated device by setting its peer DeviceID to the new target device (Lines 62-64). Next, the host sets the other end of the connection (i.e., at the target side) by reserving the CPort, setting the peer DeviceID and CPort to itself, setting the traffic class, and enabling the CPort for communication (66-70). To have a non-lossy connection in place (important for configuration), the end-to-end flow control is enabled at both directions of the connection. This is done by obtaining the Rx(?) buffer sizes for the target and host (Lines 72 and 73, respectively), obtaining the token sizes for the two directions (Lines 74 and 75, respectively), computing the number of tokens at both ends (Lines 76 and 77, respectively), and setting the token value and enabling the end-to-end flow control (Lines 78-79 and 80-81, respectively).

The remaining portion of the CO Enumerate( ) function is almost identical to the CL case, except that the host-to-target communication is performed via the host configuration CPort instead of the host configuration RPort. As a result, the SET( ) and GET( ) configuration commands do not take the destination DeviceID and RPort as parameters anymore. The only other difference is that, after calling Enumerate( ) at Line 108, the connection to the current target device has to be restored. This is done by waiting until the connection has transferred all its data and delivered all the end-to-end credit tokens (Line 110), and set the peer DeviceID back to the current target device (Lines 111-113). After the connection is restored, the routing table setup can be safely performed at Line 114.

TABLE 6

| Enumerate( ) function for CO-based device discovery and enumeration |
| --- |

```
60.   Enumerate (nextDeviceID)
61.   {
62.       LocalSET (T_ConnectionState[CFG_CPORT] = IDLE);
63.       LocalSET (T_PeerDeviceID[CFG_CPORT] = nextDeviceID);
64.       LocalSET (T_ConnectionState[CFG_CPORT] = CONNECTED);
65.
66.       SET (T_ReserveCPort[CFG_CPORT = TRUE);
67.       SET (T_PeerDeviceID[CFG_CPORT] = hostDeviceID);
68.       SET (T_PeerCPortID[CFG_CPORT] = CFG_CPORT_HOST);
69.       SET (T_TrafficClass[CFG_CPORT] = CFG_TC);
70.       SET (T_ConnectionState[CFG_CPORT] = CONNECTED);
71.
72.       peerBufSz = GET (T_PeerBufferSize[CFG_CPORT]);
73.       hostBufSz = LocalGET (T_PeerBufferSize[CFG_CPORT_HOST]);
74.       rxTokenVal = LocalGET (T_RxTokenValue[CFG_CPORT_HOST]);
75.       txTokenVal = LocalGET (T_TxTokenValue[CFG_CPORT_HOST]);
76.       txCredits = peerBufSz / 2rxTokenVal;
77.       rxCredits = hostBufSz / 2txTokenVal;
78.       LocalSET (T_RemainingCredits[CFG_CPORT] = txCredits);
79.       LocalSET (T_E2EFlowControlEnabled[CFG_CPORT] = TRUE);
80.       SET (T_RemainingCredits[CFG_CPORT] = rxCredits);
81.       SET (T_E2EFlowControlEnabled[CFG_CPORT] = TRUE);
82.
83.       numSwitchPorts = GET (N_NumSwitchPorts);
84.       if (numSwitchPorts > 1) {
85.           swPortToHost = GET (N_SwitchPortToHost);
86.           SET (N_RT.start[swPortToHost] = hostDeviceID);
87.           SET (N_RT.end[swPortToHost] = nextDeviceID−1);
88.           SET (N_RT.default[swPortToHost] = TRUE);
89.           cfgSwPort = GET (CfgSwPort);
90.           SET (N_RT.start[cfgSwPort] = nextDeviceID);
91.           SET (N_RT.end[cfgSwPort] = nextDeviceID);
92.           SET (N_EnSpecialRouting = OFF);
93.       }
94.
95.       SET (N_DeviceID = nextDeviceID);
96.       thisDeviceID = nextDeviceID;
97.       numCPorts = GET (N_NumCPorts);
98.       numRPorts = GET (N_NumRPorts);
99.       nextDeviceID += thisDeviceID + (numCPorts + numRPorts) / 32 + 1;
100.
101.      if (numSwitchPorts > 1) {
102.          SET (N_RT.end[cfgSwPort] = nextDeviceID − 1);
103.          for (sp = 0; sp < numSwitchPorts; sp++) {
104.              if ((sp == cfgSwPort) || (sp == swPortToHost))
105.                  continue;
106.              SET (N_RT.start[sp] = nextDeviceID);
107.              SET (N_RT.end[sp] = DEVICEID_MAX);
108.              nextDeviceID = Enumerate (nextDeviceID);
109.
110.              WaitConnectionBecomesIdle ( );
111.              LocalSET (T_ConnectionState[CFG_CPORT] = IDLE);
112.              LocalSET (T_PeerDeviceID[CFG_CPORT] = thisDeviceID);
113.              LocalSET (T_ConnectionState[CFG_CPORT] = CONNECTED);
114.              SET (N_RT.end[sp] = nextDeviceID−1);
115.          }
116.      }
117.  }
```

In one embodiment, after reset, an enumerated device ends up in a special state ("RESET"), in which it can receive data packets without checking the correctness of their network addresses. When a data packet is received, the ingress port that initially received the data packet is saved so that the host can later be able to read it. The data packet is then processed as normal. The function returns the response packet, which is then routed back using the special routing to the ingress port of the request. The switch performs these operations until the special routing function is disabled in favour of normal operations. Once the special routing is disabled, every data packet is checked for its network address, and if it matches the device's own network address, the configuration message contained in the packet is processed, otherwise the data packet is discarded and an error is reported. On error, a response packet is returned to the host. In the normal operation state, response packets are routed using the normal routing table, and not the special routing anymore.

Configuration message processing can proceed as follows. First, a check for the protocol is made to ensure only the configuration messages are processed. Second, a generic response message is prepared, in which the destination network address and port are filled in using the host control device values and the incoming message source device network address and port. The response message source network address and port are set to be the current device's network address and port, the protocol is set to configuration, and the execution status is tentatively set to "SUCCESS".

In the case of a set configuration command, the corresponding attribute is set, and the response packet is returned.

In a full implementation, the attribute address should also be checked to determine if it is valid, and the attribute's value should be checked to determine if it is within the attribute's valid range. If one or both of these checks fail, no action should be taken, and an error should be returned. In the case of a get configuration command, the attribute value is returned in the response. Again, in a full implementation, an error should be returned if the attribute is not valid.

An alternative embodiment of the special switch routing for CL-based device discovery and enumeration includes not only saving the ingress port of the initially incoming data packet, but also updating the switch's routing table so that all packets destined to the host control device network address are correctly routed. As a result, there may be no need to initially use the special routing. A similar embodiment is also possible for CO-based device discovery and enumeration, except that the host control device network address needs to be obtained from the configuration CPort's "T_PeerDeviceID" attribute (see Table 6) instead of from the incoming data packet. Responses should then be queued until the target receives a packet setting the T_PeerDeviceID attribute. Preferably, the T_PeerDeviceID should be set with one of the first configuration commands.

What is claimed is:

1. A control device having one or more host ports configured to connect to and communicate with a network having an initially unknown topology and a plurality of unknown devices, the control device comprising:
 a programmable processor configured to execute a start-up program that uses set and get commands to map the network by:
  discovering the plurality of unknown devices on the network using the one or more host ports; and
  enumerating the discovered devices using the one or more host ports;
 wherein the start-up program is further used by the programmable processor to determine whether each discovered device is a switch;
  to configure communication with each determined switch to take place via a switch port that first received commands from the control device;
  to configure routing tables for each determined switch, each routing table used to route communications between specified ports of the respective switch and enumerated devices; and
  to configure further communication with each determined switch to take place according to the routing table;
 wherein any communications received by a switch, prior to configuring a routing table for the switch, other than via the port that first received commands from the control device, are discarded.

2. The control device of claim 1, wherein enumerating the discovered devices includes assigning a different network address to each discovered device.

3. The control device of claim 1, wherein executing the start-up program is configured to establish the network in a functional state in which selected ones of the enumerated devices can communicate over the network.

4. The control device of claim 1, wherein the set and get commands are configured to be transmitted using network packets, each network packet including a source network address, and a destination network address.

5. The control device of claim 4, wherein enumerating the discovered devices includes assigning different network addresses to each device.

6. The control device of claim 4, wherein each network packet further includes a source port designation and a destination port designation.

7. The control device of claim 4, wherein prior to being assigned a network address, a selected device is configured to accept network packets having any network address, and subsequent to being assigned a network address, the selected device is configured to only accept network packets having valid network addresses.

8. The control device of claim 1, wherein the same one of the one or more host ports is configured to be used to set up connections with each of the discovered devices.

9. The control device of claim 1, wherein enumerating of each discovered device takes place before another device is discovered.

10. The control device of claim 9, wherein when a selected switch is discovered and enumerated, the start-up program is further used by the programmable processor to discover and enumerate each device connected to the selected switch before discovering other devices.

11. The control device of claim 1, wherein the control device is a mobile device.

12. The control device of claim 11, wherein the mobile device comprises a cell phone, PDA, media player, game console or camera.

13. The control device of claim 1, wherein after enumerating all network devices, the start-up program is configured to update any routing tables for communications between devices other than the control device.

14. A method for using a control device to execute set and get commands for connecting to and communicating with a network having an initially unknown topology and a plurality of unknown devices, the method comprising;
 discovering the unknown devices on the network using one or more host ports of the control device;
 enumerating the discovered devices by using the one or more host ports to assign a different network address to each discovered device;
 determining whether each discovered device is a multiple-port switch, each multiple-port switch having more than one communications port;
 configuring each determined multiple-port switch to save information identifying which communications port received an initial data packet and use the identified initial data packet port to route communications back to the control device;
 configuring a routing table for each multiple-port switch, the routing table used to route communications based on network addresses to one of the switch ports; and
 after routing table is configured, disabling communications routing through the initial data packet port in favor of the routing table.

15. The method of claim 14, further comprising configuring the control device to communicate with the unknown devices via the one or more host ports.

16. The method of claim 15, wherein during configuring a selected multiple-port switch, data packets communicated via any port other than the identified initial data packet port are discarded.

17. The method of claim 14, wherein each device accepts all data packet communications until the enumerating step is performed for the device, the device thereafter accepting only data packet communications carrying a valid network address.

* * * * *